US012708803B2

(12) United States Patent
Mcmullan-Martin

(10) Patent No.: US 12,708,803 B2
(45) Date of Patent: Aug. 18, 2026

(54) AT HEIGHT SAFETY SYSTEM AND METHOD OF USE THEREOF

(71) Applicant: TruBlue LLC, Louisville, CO (US)

(72) Inventor: Nathaniel Mcmullan-Martin, Sheffield (GB)

(73) Assignee: TruBlue LLC, Louisville, CO (US)

( * ) Notice: Subject to any disclaimer, the term of this patent is extended or adjusted under 35 U.S.C. 154(b) by 497 days.

(21) Appl. No.: 18/043,815

(22) PCT Filed: Sep. 17, 2021

(86) PCT No.: PCT/GB2021/052413
§ 371 (c)(1),
(2) Date: Mar. 2, 2023

(87) PCT Pub. No.: WO2022/064180
PCT Pub. Date: Mar. 31, 2022

(65) Prior Publication Data

US 2023/0264053 A1 Aug. 24, 2023

(30) Foreign Application Priority Data

Sep. 23, 2020 (GB) ..................................... 2015032

(51) Int. Cl.
*G08B 13/00* (2006.01)
*A62B 35/00* (2006.01)
*A63B 69/00* (2006.01)

(52) U.S. Cl.
CPC ...... *A62B 35/0093* (2013.01); *A63B 69/0048* (2013.01); *A63B 2225/54* (2013.01)

(58) Field of Classification Search
CPC ............ A62B 35/0093; A63B 69/0048; A63B 2225/54; A63B 2220/803; A63B 71/0054;
(Continued)

(56) References Cited

U.S. PATENT DOCUMENTS 5,254,058 A 10/1993 Savigny
5,732,954 A * 3/1998 Strickler ............ A63B 69/0048 482/37
(Continued)

FOREIGN PATENT DOCUMENTS

CN 103942906 A 7/2014
CN 104616037 A 5/2015
(Continued)

OTHER PUBLICATIONS

International Preliminary Report on Patentability in PCT/GB2021/052413, mailed Mar. 28, 2023, 9 pages.
(Continued)

*Primary Examiner* — Tai T Nguyen
(74) *Attorney, Agent, or Firm* — Merchant & Gould P.C.

(57) ABSTRACT

An at height safety system and method of use thereof An at height safety system is provided including detection apparatus for location at at least one required position or in at least one pre-determined area that is to be monitored in use. Identification means are provided on or associated with an item that is to be monitored in use. The detection apparatus includes first detection means arranged for detecting the presence of a person in use and at least second detection means arranged for detecting the identification means in use. Processing means are provided for processing one or more signals and/or data received from the first and/or at least second detection means.

18 Claims, 5 Drawing Sheets

(58) Field of Classification Search
CPC . A63B 2009/004; A63B 69/0064; E06C 7/18; E06C 7/186; G08B 21/02
USPC .......................................................... 340/541
See application file for complete search history.

(56) References Cited

U.S. PATENT DOCUMENTS

| | | | | |
|---|---|---|---|---|
| 7,381,154 | B1 | 6/2008 | Sudeith | |
| 7,557,712 | B2 | 7/2009 | Shelton | |
| 7,727,118 | B1 | 6/2010 | McCall | |
| 7,780,576 | B1 | 8/2010 | Sudeith | |
| 7,819,778 | B1 | 10/2010 | Sudeith | |
| 8,038,581 | B1 | 10/2011 | Sudeith | |
| 8,141,681 | B2 | 3/2012 | Brickell | |
| 8,408,360 | B2 | 4/2013 | Postma | |
| 9,211,462 | B2 | 12/2015 | McGowan et al. | |
| 9,589,437 | B2 | 3/2017 | McGowan | |
| 2007/0229663 | A1 | 10/2007 | Aoto et al. | |
| 2007/0285241 | A1 | 12/2007 | Griebnow | |
| 2008/0185221 | A1* | 8/2008 | Postma | A63B 69/0048 700/80 |
| 2008/0296372 | A1* | 12/2008 | Joe | G07C 1/22 235/384 |
| 2009/0015371 | A1 | 1/2009 | Bocquet | |
| 2010/0231402 | A1 | 9/2010 | Flynt et al. | |
| 2012/0038456 | A1 | 2/2012 | Pikkarainen | |
| 2012/0279801 | A1 | 11/2012 | Watson | |
| 2014/0266720 | A1 | 9/2014 | McGowan et al. | |
| 2015/0057776 | A1* | 2/2015 | Skjaerseth | A63B 71/0616 700/91 |
| 2017/0099424 | A1* | 4/2017 | Jones | G02B 27/0093 |
| 2019/0176011 | A1* | 6/2019 | Lehrer | A63B 71/0622 |
| 2019/0197861 | A1* | 6/2019 | Tunnell | A61B 5/0205 |
| 2021/0086002 | A1* | 3/2021 | Bailey | F16D 59/00 |
| 2021/0275888 | A1* | 9/2021 | Speed | A63B 69/0048 |

FOREIGN PATENT DOCUMENTS

| | | | |
|---|---|---|---|
| KR | 101370574 B1 * | 3/2014 | G06Q 30/0251 |
| WO | 2006/102704 | 10/2006 | |

OTHER PUBLICATIONS

International Search Report in PCT/GB2021/052413, mailed Dec. 6, 2021, 4 pages.

Chinese 2nd Office Action and Supplementary Search Report in corresponding Application 2021800771430, mailed May 16, 2026, 8 pages.

* cited by examiner

AT HEIGHT SAFETY SYSTEM AND METHOD OF USE THEREOF

CROSS REFERENCE TO RELATED APPLICATIONS

This is a U.S. National Phase application claiming priority to PCT/GB2021/052413, filed Sep. 17, 2021, which application claims priority to British application 2015032.2, filed Sep. 23, 2020.

This invention relates to an at-height safety system and method of use thereof, and preferably to an at height safety system for use in applications which are generally undertaken at or above a pre-determined minimum height above a ground surface, where there is a potential fall or injury risk posed to a user because of the height.

Although the following description refers almost exclusively to an at height safety system for use on a climbing wall, this is merely for illustrative purposes and it will be appreciated by persons skilled in the art that the present invention can be used for a variety of different at height applications, such as rope access applications, arborist applications, offshore platform work applications, construction work applications, mast rigging applications, bridge work applications, energy industry applications, such as wind turbine access, power line access, industrial applications, adventure park applications and/or the like.

Rock climbing is a popular leisure pursuit and indoor artificial rock climbing walls have become common place. They allow members of the public to try out or practise climbing in a relatively safe and controlled environment. For safety reasons, automatic belay devices are typically used on climbing walls to prevent injury to a climber if they accidentally fall from the wall. An automatic belay device can include a spring loaded reel located at a top of the climbing wall with a rope associated with the reel. A user clips onto a lower section of the rope when using the climbing wall and the belay takes up the slack in the rope while the climber is ascending and uses a braking system when the climber is descending. A potential problem with this system is that a user may forget to fasten onto the automatic belay device, thereby placing the user at risk of injury or death if they fall.

In order to mitigate the above problem, it is known to provide an automatic belay warning system, such as that described in U.S. Pat. No. 8,408,360. This system provides a first sensor positioned at a lower end of a climbing rope to sense whether the rope is secured to the climbing wall and to provide a first signal. A second sensor is provided on the climbing wall at a selected height above a ground surface for sensing when the climber has reached the selected height and provides a second signal. The system also includes a warning alarm and a processor is provided for receiving the first and second signals to determine if the climber has reached the selected height with the lower end of the climbing rope still secured to the wall and, if so, activating the alarm to inform the user that they are not correctly attached to the automatic belay system. A problem with this system is that a user could unclip the rope at the base of the climbing wall to provide a positive signal but still forget to clip the rope to their climbing harness. This would result in an alarm not being activated once the climber reached the second sensor. In addition, the system requires two or more sensors to be fixedly located at two spaced apart locations on the climbing wall, thereby making it a relatively complex, intrusive and costly system. Furthermore, the system disclosed in U.S. Pat. No. 8,408,360 is limited to climbing wall auto belay systems and there is no teaching as to how the system could be used for other applications.

It is therefore an aim of the present invention to provide an at height safety system and/or a method of use thereof that overcomes the abovementioned problems.

It is a further aim of the present invention to provide an at height safety system and/or a method of use thereof that provides greater flexibility of use in a broader range of at height applications.

It is yet a further aim of the present invention to provide an at height safety system and/or a method of use thereof that allows for data collection of one or more variables and/or parameters.

According to a first aspect of the present invention there is provided an at height safety system, said system including detection apparatus for location at at least one required position or in at least one pre-determined area that is to be monitored in use; identification means provided on or associated with an item that is to be monitored in use; and wherein said detection apparatus includes first detection means arranged for detecting the presence of a person in use, at least second detection means arranged for detecting the identification means in use, and processing means for processing one or more signals and/or data received from the first and/or at least second detection means in use.

Thus, the present invention, in its simplest form, provides detection apparatus comprising at least two detection means capable of detecting both a person and an item at the position or within a pre-determined area of the detection apparatus in use. This provides a simple and cost effective system that requires minimal "in-situ" or intrusive devices, which overcomes the problems with the prior art and which ensures that both the item and the person are being detected at the same or similar position or within a pre-determined area of the detection apparatus.

Preferably a pre-determined response is generated by the system and/or processing means depending on the result and/or value of the processed one or more signals and/or data and/or depending on the signals and/or data detected by the first and/or at least second detection means.

In one embodiment the detection apparatus is, includes or consists of a single and/or integral unit or housing.

In one embodiment the first and at least second detection means form part of a single system but are provided in independent and/or separate housings or units. Preferably the independent and/or separate housings or units are provided within a pre-determined distance of each other.

Preferably the at height safety system is for use in applications and/or activities which are generally undertaken a minimum pre-determined height above a ground surface, and typically where there is a potential fall or injury risk posed to a user because of the height above the ground surface.

Preferably the at height safety system can be used in applications that involve a person and/or item moving in a horizontal direction, a vertical direction and/or one or more directions therebetween.

In one embodiment attachment means are provided on and/or associated with the detection apparatus for attaching or detachably attaching the detection unit in a required position and/or at a required location in use. Thus, in one embodiment the detection apparatus is generally fixed in a required position and left to perform one or more detection functions.

Preferably the attachment means includes any or any combination of one or more attachment members, screws, nuts and bolts, clips, ties, inter-engaging members, brackets, magnets, magnetic members, friction fit, adhesive, welding and/or the like.

In one embodiment the detection apparatus is integrally formed with a construction component, such as a ladder, building, building panel, building block, construction frame and/or the like.

Preferably the detection apparatus is located at a height above a ground or floor surface in use (i.e. the at least one required position and/or in at least one predetermined area) which may cause or risk injury to a user if they were to fall at that height to the ground or floor surface. The height chosen for location of the detection apparatus preferably depends on one or more factors, such as the age or height of a user of the system, the type of ground or floor surface onto which a user may fall (i.e. whether it is a hard surface, a soft surface, a crash mat, specialised sprung flooring and/or the like), the health and/or mobility of the user of the system and/or the like. For example, the detection unit could be located at a height of approx. 1.5 metres when the system is being used by children, or the detection unit could be located at a height of approx. 3 metres when the system is being used by adults.

Preferably the detection apparatus includes a housing in which the first and at least second detection means are located in or associated with use.

Preferably the detection apparatus or unit is made and/or arranged so as to withstand various environmental and/or weather conditions, such as being resistant to extreme heat, cold, water, dirt, wind, vibrations and/or the like. For example, the detection unit could be made from a metal and/or plastic housing and/or include one or more sealing means or members to seal of substantially seal the interior of the apparatus, housing or unit rom external environmental conditions.

In one embodiment the system includes a plurality of detection apparatus or units. Preferably each detection apparatus is located at one of a number of possible and/or different locations in use.

Preferably the plurality of different locations are adjacent to each other or a spaced distance apart from each other.

In one embodiment power supply means are provided on and/or associated with the detection apparatus for providing a power supply to the same in use. For example, the power supply means could include electrical power supply means, mains power supply means, one or more batteries, rechargeable batteries, solar power means, wind power means and/or the like.

In one embodiment the item with which the identification means is provided on and/or associated with is a portable item and is movable relative to the detection apparatus in use, and preferably movable relative to a fixed detection apparatus in use.

Preferably the item is any item or object for which there is a requirement to monitor and/or detect in use, typically but not necessarily exclusively for safety purposes, such as for example an item of safety equipment, at height safety equipment, climbing equipment and/or is an item worn by a person in use.

In one embodiment the item could include any or any combination of a helmet, climbing harness, carabiner, torch, tool, glasses, safety goggles, climbing accessory, item of clothing or footwear and/or the like.

Preferably the detection apparatus is able to detect and/or monitor whether a person is present or not, whether the item is present or not, whether the item is being worn by a user pr person, whether the item is being worn and/or used correctly by a user or person and/or the like.

Preferably the identification means is any means or device which allows identification of itself and/or an item on which it is provided or associated with by the second detection means of the detection apparatus in use.

Preferably the identification means includes a unique identification means, element or data part or device to allow each identification means, and/or the item on which the identification means is provided on or associated with, to be uniquely identified. Thus, in one embodiment where the system includes a plurality of identification means, the detection apparatus is able to detect, identify and distinguish each of the plurality of identification means separately and/or independently. This allows specific data to be collected in respect of each individual identification means and/or each individual item on which the identification means is provided on or associated with in use.

In one embodiment the identification means is passive in that it not powered and/or does not actively transmit data and/or one or more signals therefrom in use. In this embodiment the identification means has data associated with the same that can be sensed, read and/or detected by the at least second detection means in use.

In one embodiment the identification means is active in that it is powered and/or actively transmits data and/or one or more signals therefrom in use. In this embodiment the identification means actively transmits data associated with the same for sensing, reading and/or detection by the second detection means in use.

In one embodiment the identification means can by any or any combination of a beacon, Radio Frequency Identification (RFID) tag, bar-code, electronic chip, Quick Response (QR) code and/or the like.

Preferably the system includes a plurality of identification means, and further preferably a plurality of uniquely identifiable identification means.

In one embodiment a plurality of identification means could be associated with one particular user. For example, a number of different safety items could be provided with unique identification means and a user may be required to have on their possession said number of different safety items in order to meet a certain safety requirement.

In one embodiment a plurality of identification means could be provided and each identification means could be associated with a different user. In this way, the detection means can distinguish one particular user from another user.

Preferably the processing means of the detection apparatus and/or the identification means can be programmed such that certain data can be associated with a particular identification means. This data can allow one identification means to be associated with a particular person or user, item, variable, parameter and/or the like of the system.

In one embodiment the first and at least second detection means are the same or similar in form.

In one embodiment the first and at least second detection means are different in form.

In one embodiment the first and at least second detection means are arranged to detect a person and the identification means simultaneously or substantially simultaneously in time.

In one embodiment the first and at least second detection means are arranged to detect a person and the identification means at different times or a pre-determined timed distance apart.

Preferably the first and/or second detection means are arranged to sense or detect a person and/or identification means respectively when said person and/or identification means are moved to, within or located a pre-determined distance or range from said detection means in use. Thus, when the identification means and/or person is moved within a pre-determined distance or range of the detection means, the detection means detects the presence of the identification means and/or person.

Preferably the pre-determined distance or range where detection by the detection means is possible is such that false detections are not possible or are unlikely to occur. For example, the range could be 2 metres or less, 1 metre or less and/or the like.

In one embodiment it is to be noted that the system can be set up such that the detection means can positively detect something and therefore generate a signal to identify this detection, or the system could be set up such that the absence of detection could result in the generation of a signal.

In one embodiment the second detection means is any detection device, sensing device or reader that allows detection, sensing, reading and/or monitoring of the identification means in use.

In one embodiment the at least second detection means is any or any combination of a beacon sensor, an RFID reader, bar-code reader, QR code reader, electronic chip reader and/or the like.

In one embodiment the first detection means is any detection device or sensing device that allows the detection, sensing and/or monitoring of a person or user in use.

In one embodiment the first detection means is any or any combination of at least temperature sensing means, a heat sensor, a thermal imaging camera, a motion sensor, identification means associated with the person or user, a thermal infra-red sensor, a GRID-EYE PIR sensor and/or the like.

In one embodiment the first detection means may detect and/or verify the presence of a person or user at least partly based on or any or any combination of the following: a size and/or shape of an object within a pre-determined range; a temperature or thermal image of an object within a pre-determined range; an image of an objected with pre-determined image parameters; or on movement of an object within pre-determined parameters.

Preferably the first detection means and/or processing means is arranged to ignore parameters, movements, sizes and/or shape, certain temperatures or thermal images falling outside the pre-determined range or ranges so as to prevent accidental responses by the system.

In one embodiment two or more first detection means and/or two or more second detection means are provided to allow a pre-determined area to be covered by the detection means.

In one embodiment the first and/or second detection means are arranged to cover an angle of detection area of approx. 180 degrees from the detection apparatus. For example, a first detection means could cover 60 degrees of detection area and the number and arrangement of first detection means could be adjusted to provide the required detection area.

Preferably software, one or more algorithms and/or computer programs is associated with the first and/or second detection means and/or processing means and is arranged to detect the presence of a human being, ID data and/or the like.

Preferably the processing means are micro-processing means arranged to process one or more signals and/or data received and/or transmitted by the first and/or at least second detection means in use.

In one embodiment the processing means are programmable to allow data relating to the first and/or second detection means and/or the identification means to be stored and/or processed by the detection apparatus prior to initial use or during use of the detection apparatus.

Preferably the system or detection apparatus includes memory means, such as for example, a data storage device, RAM and/or the like to allow data to be stored in the detection apparatus.

In one embodiment the processing means processes one or more signals and/or data received from the first and/or at least second detection means in use and provide a response, and preferably a pre-determined response, based on the processed signals and/or data received.

Preferably the detection apparatus collects data and/or communicates data in real time.

Preferably timing means and/or a clock is provided with or associated with the detection apparatus to allow a time of detection, define a time period at or over which detection is required to take place, define a time period at or which transfer of data or logged data is required to take place and/or the like.

Preferably the response or pre-determined response can occur as a result of an absolute value being identified by the first and/or second detection means (i.e. such as a "yes" or "no" signal being detected), and/or once a pre-determined threshold value has been identified by the first and/or second detection means.

Preferably the response, at least one of a plurality of responses, or at least one of a plurality of pre-determined responses, can occur as a result of an absolute value or pre-determined threshold value being identified by the first and/or second detection means in use.

Preferably the response or plurality of responses can include any or any combination of a recorded response, recording response, a download response, a warning response, an alarm response, a data collection response and/or the like.

Preferably the data associated with the identification means and/or the data detected by the first and/or second detection means can include a single variable, a plurality of pre-determined variables, a plurality of user selected variables and/or the like.

Preferably the one or more variables are pre-programmed into the processing means of the detection apparatus and/or are programmable by a user into the processing means of the detection apparatus to provide flexibility in the variables that are being monitored, sensed and/or detected by the system in use.

In one embodiment one or more variables being detected, sensed and/or monitored by the first and at least second detection means are pre-programmed into the processing means of the detection apparatus and/or are programmable by a user into the processing means of the detection apparatus.

In one embodiment warning means are provided on and/or associated with the system, detection apparatus, communication means and/or identification means in use. The warning means can be used to warn and/or inform a user or third party of a particular status, response, condition and/or the like relating to the system in use.

Preferably the warning means can include a visual warning, audible warning, and/or kinesthetic warning.

For example, the visual warning could include illumination means, one or more lights, LEDS, written warning signs, images, symbols, letters, numbers and/or the like being lit or displayed when a particular status has been identified by the system. For example, one or more red lights could be lit if a dangerous or unsafe situation has been detected. One or more green lights could be lit if a safe situation has been detected.

For example, the audible warning could include one or more alarms, warning sounds, spoken messages, speakers, microphones, sound generating device and/or the like.

For example, the kinesthetic warning could include a vibrating device that vibrates to warn a user of a particular situation.

In one embodiment different levels or tiers of warning means or response generated by the warning means are provided depending on the severity of a particular status being detected by the system. Thus, in one embodiment, a hierarchy of responses are provided in the system and the processing means selects one of a number of possible responses depending on the data and/or signals detected by the first and/or at least second detection means.

For example, a first level warning could be generated by the warning means if a very dangerous situation has been detected by the system. Such an example may be where a user has been detected by the first detection means at a particular height but identification means associated with an item of safety equipment, such as a climbing harness, has not been detected at all. A second warning level could be provided by the warning means if a situation has been detected that is unsafe but which may not result in immediate danger to a user of the system. Such an example may be where a user has been detected by the first detection means at a particular height, identification means associated with a harness has been detected by the second detection means but identification means associated with safety goggles has not been detected by the at least second detection means. A third warning level could be provided by the warning means if a situation has been detected that is not necessarily unsafe but which may want to be checked by a member of staff. Such an example may be where identification means associated with an auto-belay clip has been detected at a particular height by the second detection means but where a person has not been detected by the first detection means. The users of the system can detect which level or tier of warning is being generated and respond to it accordingly.

In one embodiment the system includes communication means for allowing data and/or one or more signals to be communicated to and/or from the detection apparatus, the first and/or at least detection means, process means and/or the like in use.

In one embodiment the communication means includes at least one communication device that is separate to and remote from the detection apparatus in use. The communication device allows a user or third party remote to the detection apparatus to monitor the detection apparatus in use.

Preferably the system includes a plurality of communication devices, each communication device being able to communicate with one or more detection apparatus in use. For example, a plurality of staff of a climbing wall could be provided with communication devices to allow monitoring of the detection apparatuses associated with a number of climbing wall routes.

In one embodiment the communication device is a portable device and/or it can be a fixed device.

In one embodiment power supply means are provided on or associated with the communication device for providing power to the device in use.

Preferably the power supply means of the communication device can include any or any combination mains power supply, generator power supply, one or more batteries, rechargeable batteries, solar powered means, wind powered means and/or the like.

Preferably the at least one communication device can be in the form of a pager device, a mobile phone, a computer, lap top, tablet device and/or the like.

In one embodiment a touch screen display and/or one or more user input means can be provided on or associated with the communication means or device to allow one or more user inputs. For example, a user may wish to cancel an alarm once a situation has been dealt with, a user may wish to initiate data transfer between the detection apparatus and the communication device and/or the like.

In one embodiment the communication means or device may act as a master unit and the communication means associated with the detection apparatus may act as slave units. The master unit may be used to control one or more parameters, data, signals, operation and/or the like of the slave units in use. Alternatively, or in addition, one communication means or device or one detection apparatus may act as a master unit and one or more other communication devices or detection apparatus may act as slave units.

Preferably the communication means or device includes a transmitter and/or receiver for transmitting and/or receiving one or more signals and/or data with the detection apparatus in use.

Preferably the at least one communication means or device can include any or any combination of a display screen for displaying data thereon, memory means for storing data thereon, user input means for allowing a user to input data into the device and/or the like.

Preferably the detection apparatus includes transmitter and/or receiving means for transmitting and/or receiving one or more signals and/or data in use. The detection apparatus can transmit and/or receive data with the at least one communication device and/or with the identification means in use.

Preferably the at least one communication means or device and at least one detection apparatus communicate via wired or wireless means, such as via Bluetooth, WIFI, radio frequency (RF), infra-red (IR) and/or the like.

According to a second aspect of the present invention there is provided a method of using an at height safety system, said system including detection apparatus for location at at least one required position or in at least one pre-determined area that is to be monitored in use; identification means provided on or associated with an item that is to be monitored in use; and wherein said method includes the step of detecting the presence of a person using the system via first detection means; detecting the identification means using at least second detection means; processing one or more signals and/or data received from the first and/or at least second detection means using processing means.

In one embodiment the at height safety system is an automatic belay safety system or a climbing tether safety system.

In one embodiment the detection apparatus includes a data connection means or port to allow a data collection device to be connected to the same and download data from the detection apparatus in use. For example, the data connection means or port could include a USB connection port or connection wire.

According to a further aspect of the present invention there is provided an at height safety system, said system including at least one detection apparatus for location at at least one required position or in an least one area that is to be monitored in use; identification means provided on or associated with an item that is to be monitored in use; and communication means for allowing communication between a communication device and the at least one detection apparatus in use; wherein said detection apparatus includes first detection means arranged for detecting the presence of a person in use, at least second detection means arranged for detecting the identification means in use, and processing means for processing one or more signals and/or data received from the first and/or at least second detection means in use.

According to a further aspect of the present invention there is provided an item including identification means for use in an at height safety system.

Embodiments of the present invention will now be described with reference to the following figures, wherein.

Figure 1:
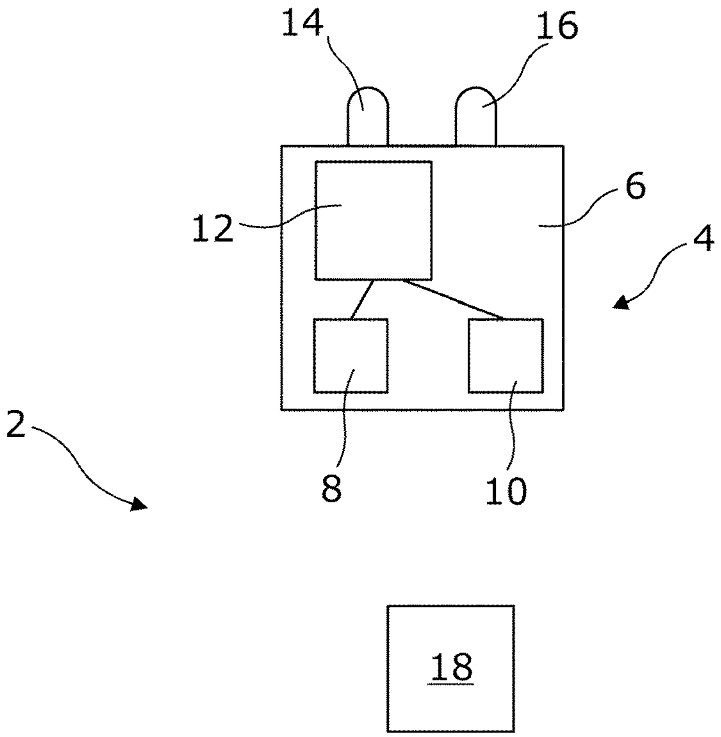
FIG. 1 is a simplified schematic of an at height safety system according to an embodiment of the present invention.
Figures 3A, 3B:
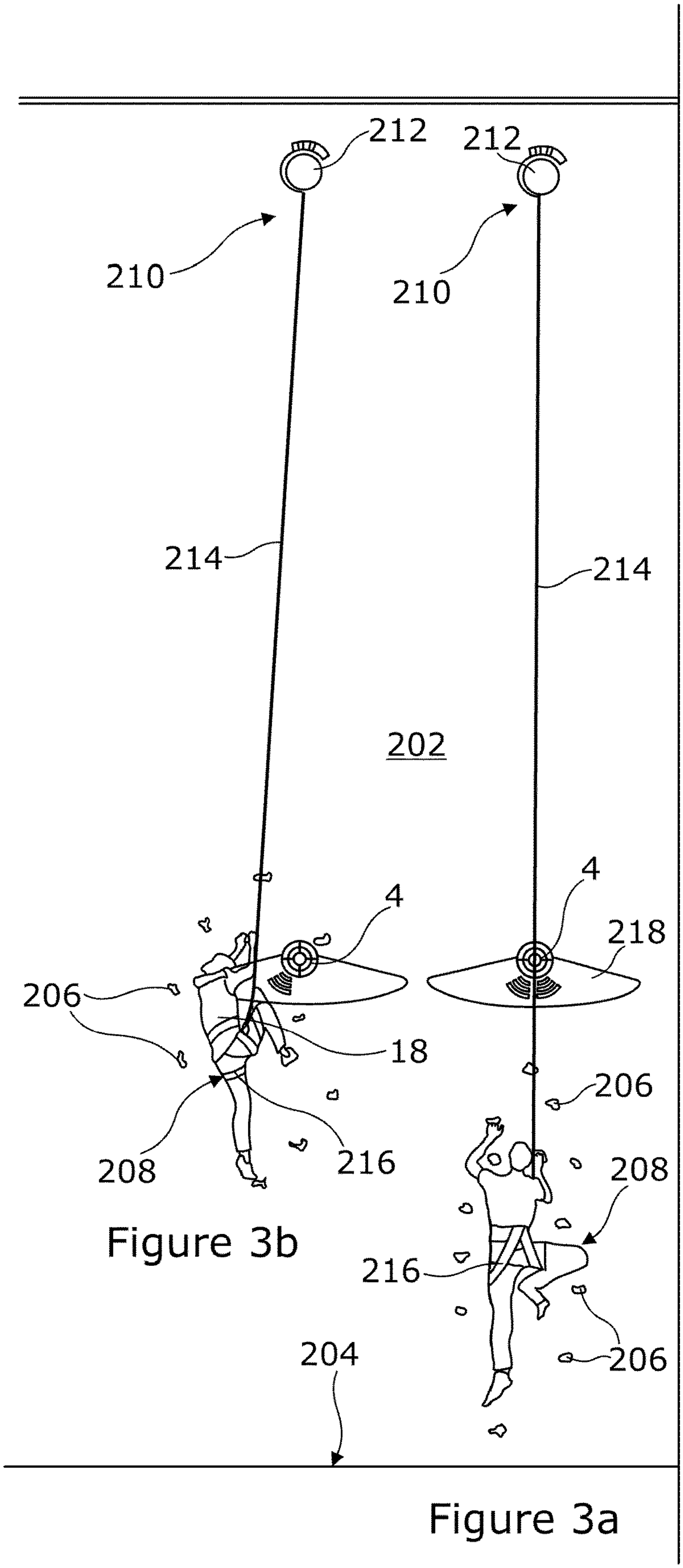
Figure 4:
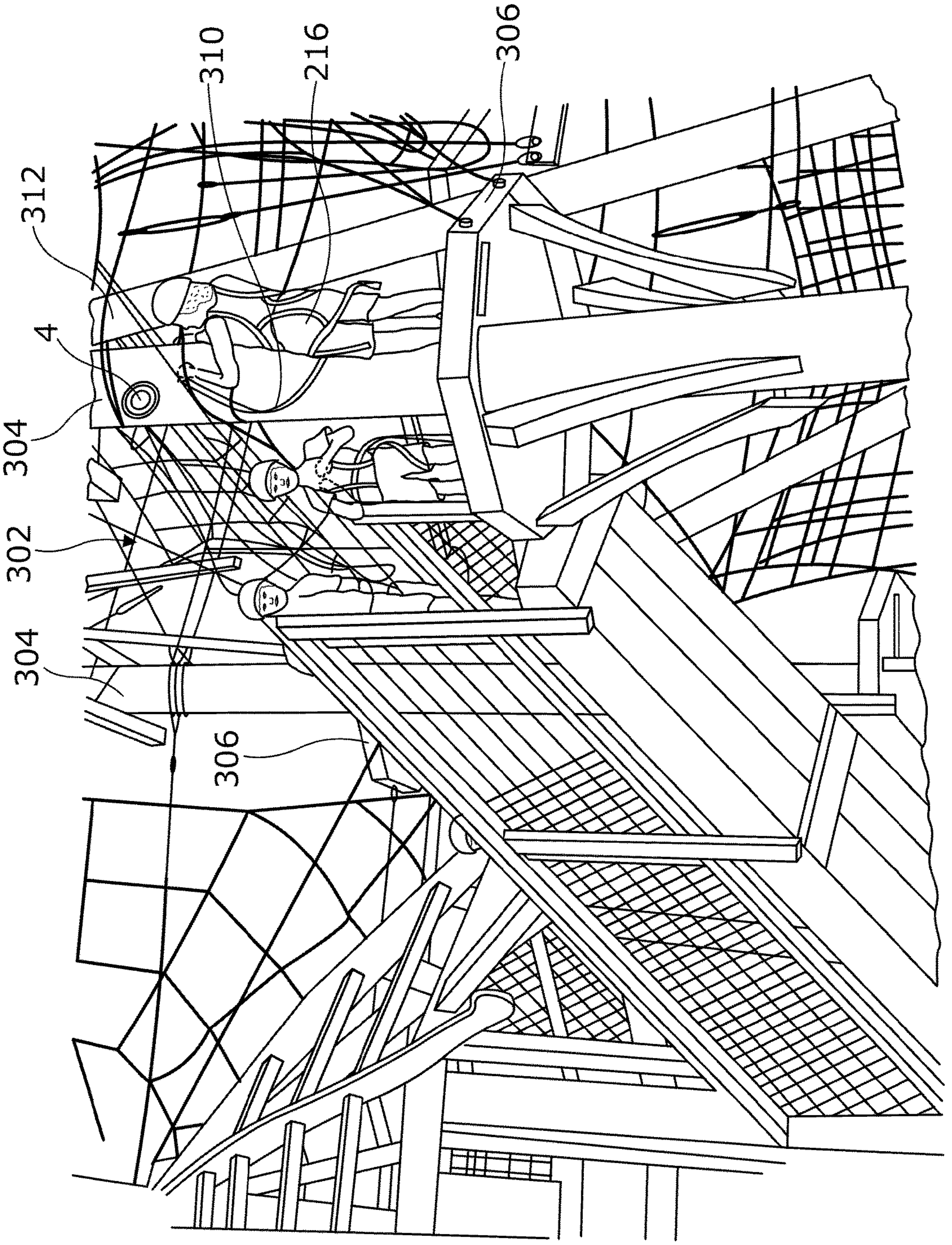
Figure 5A:
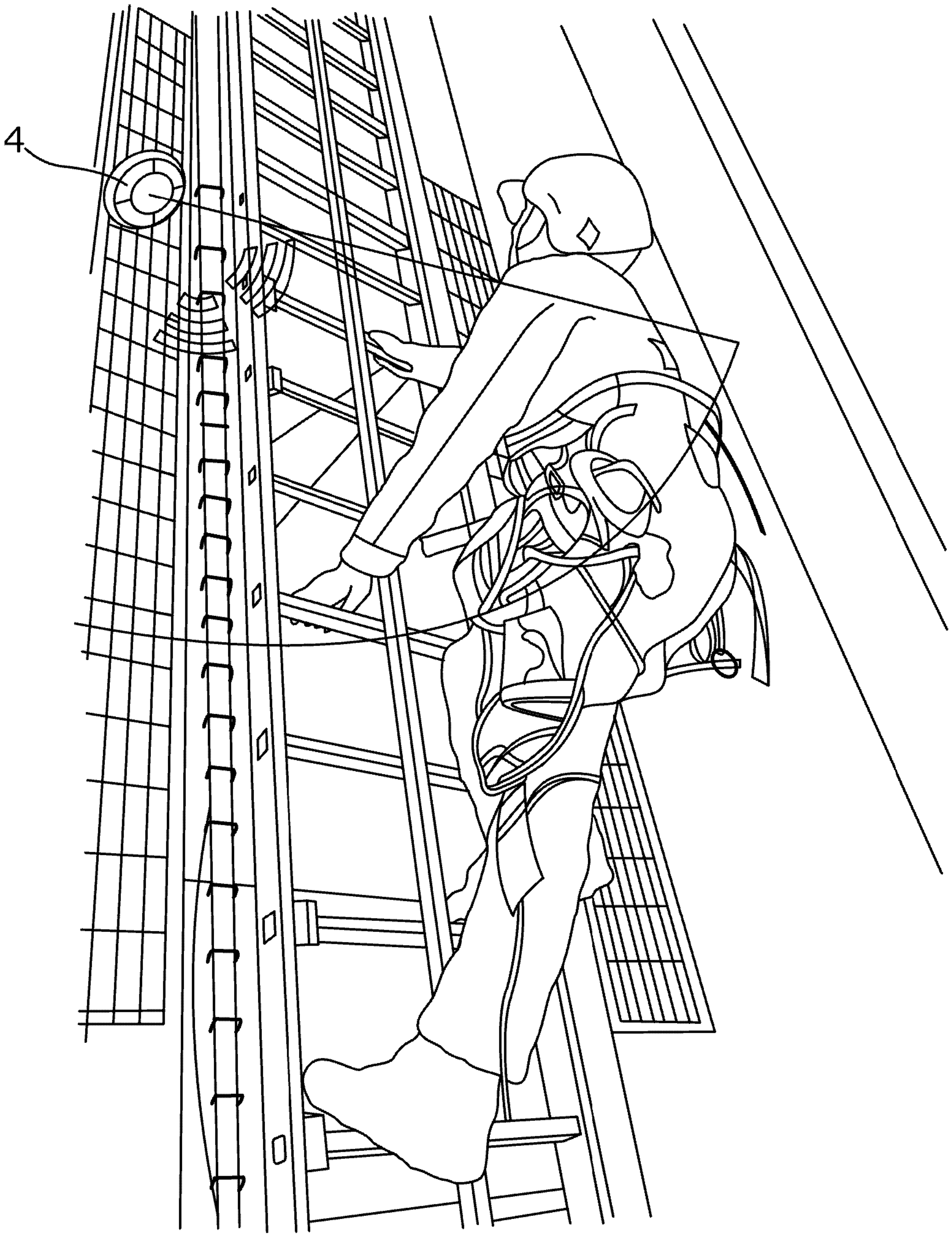
Figure 5B:
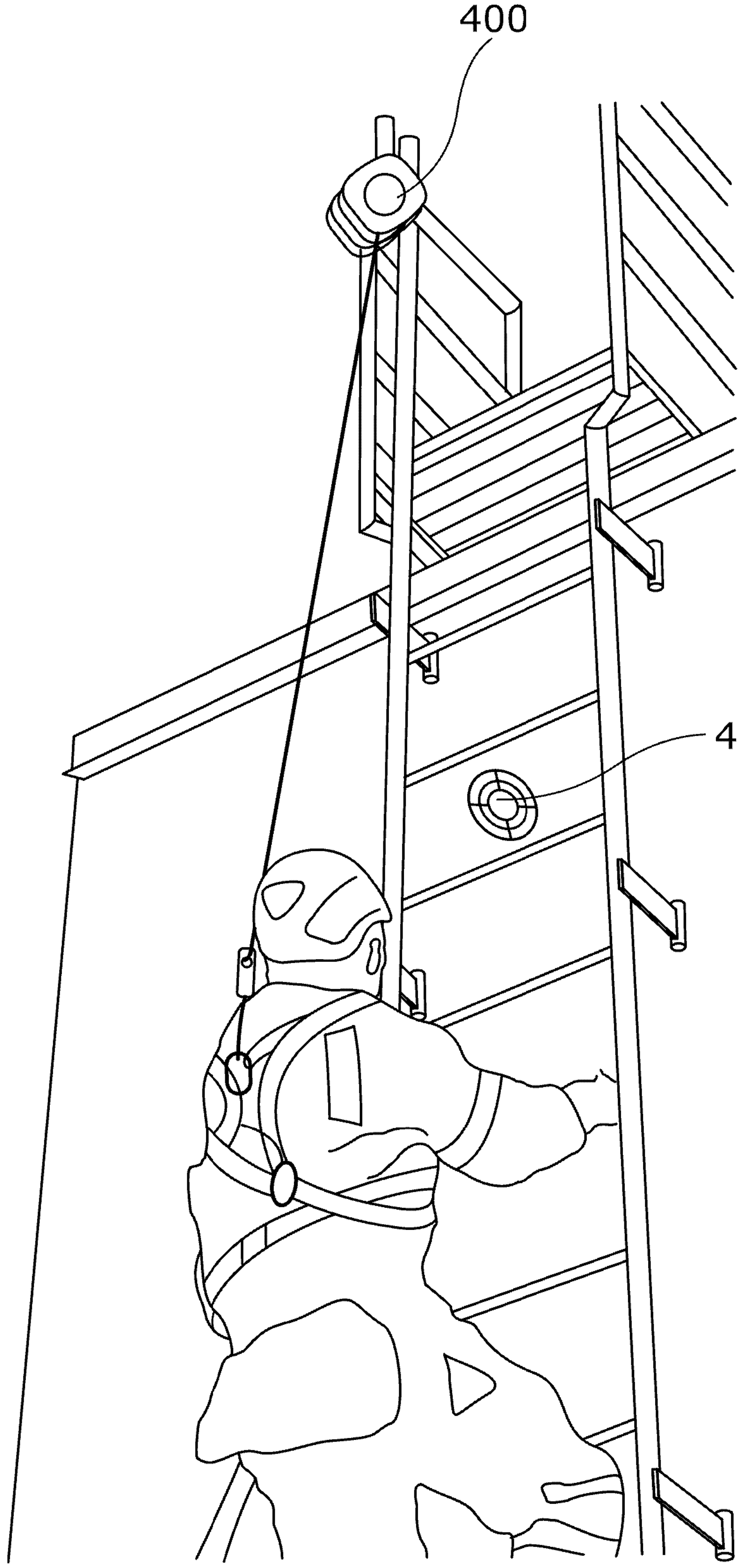

FIGS. 3*a* and 3*b* show one example of use of the at height safety system on a vertical climbing wall when a climber is a) out of range of the detection unit and b) in range of the detection unit, respectively;

FIG. 4 shows an example of use of the at height safety system on a horizontal rope system that might be used in a tree top adventure park;

FIGS. 5*s* and 5*b* show examples of use of the at height safety system for rope access work in an industrial setting Referring to FIG. 1, there is illustrated an at height safety system 2 according to an embodiment of the present invention. The system 2 is designed to monitor and/or warn a user of the system about whether they, or another user, are undertaking a particular activity safely and/or are whether they are wearing the correct safety equipment while undertaking an at height application.

System 2 includes a detection unit 4, which in one example can be wall mounted using suitable fixture means, such as screws, nuts and bolts and/or the like.

The detection unit 4 includes a housing 6 containing first detection means in the form of a thermal imaging camera 8 and second detection means in the form of an RFID tag reader 10. Processing means in the form of a micro-processing device 12 is also located in the housing 6 and communicates with camera 8 and reader 10 to transmit, receive and/or process one or more signals and/or data with the same.

The detection unit 4 can also optionally include warning means for warning a user or third party of a particular condition being detected by the system, such as a safe or unsafe condition being detected. In this example, the warning means is in the form of warning lights, wherein a green light 14 is lit to show that a safe condition is being detected by the detection unit, or a red light 16 is lit to show that an unsafe condition is being detected by the detection unit. However, other warning means could be provided, such as an audible alarm and/or the like.

An RFID tag 18 is locatable on an item and/or person in use which can be detected and read by the reader 10 when located within a pre-determined distance of the reader 10.

The item or person to which the tag 18 is attached is typically portable and movable relative to the detection unit, whereas the detection unit is typically fixed in a required position during use in one example.

The micro-processing device 12 can be arranged so as to generate a pre-determined response following any detection of a person and/or tag 18 in use. Alternatively, the micro-processing device 12 can be arranged so as to generate a pre-determined response only once pre-determined conditions or a pre-determined value has been met or detected by the camera 8 and/or reader 10 in use. For example, the processing device 8 could be arranged to generate a positive response only once a certain sized thermal image has been generated or a thermal image of a certain average temperature has been detected by camera 8. This removes the risk of generating a positive response in error if, for example, a small bird were to pass in front of the camera 8. The processing device 8 could be arranged to generate a negative response only once an RFID tag has been detected that the system is not programmed to detect, such as for example the presence of an unauthorised user of the system.

Figure 2:
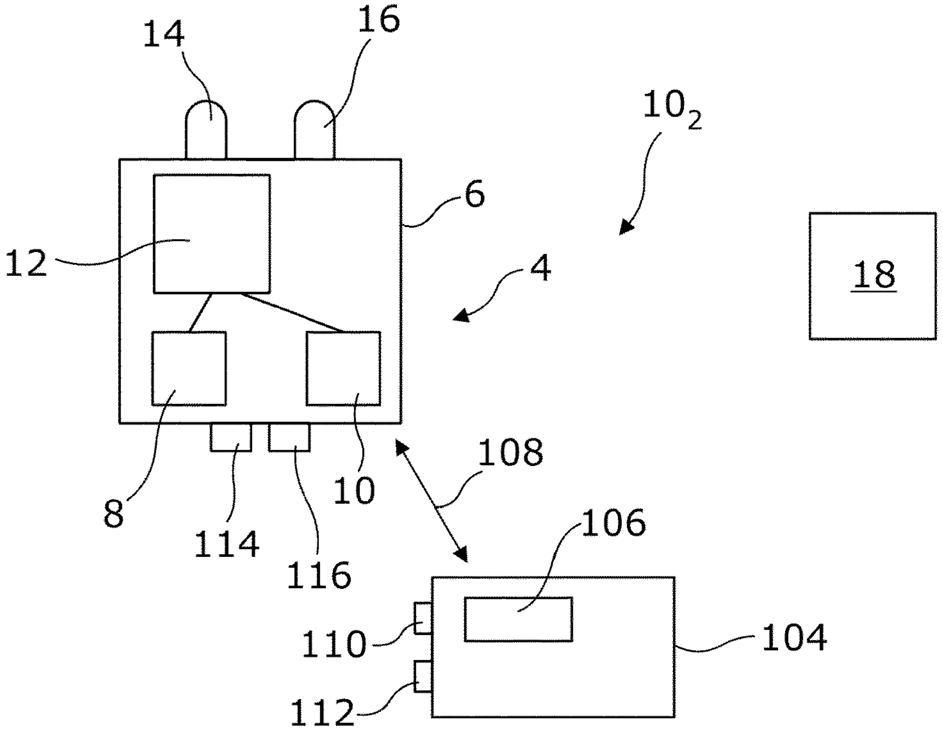
FIG. 2 is a simplified schematic of an at height safety system according to a further embodiment of the present invention.

FIG. 2 shows a similar system 102 to that of system 2 shown in FIG. 1 but with the addition of a communication device 104. (Similar reference numerals are used to denote similar features used in FIG. 1.)

The communication device 104 in one example is in the form of a pager having a display screen 106 for the display of data relating to the status and/or one or more detected conditions of the system 102. The detection unit 4 can communicate with the communication device 104 via one way or two way communication as required, and as shown by arrow 108. A transmitter 110 is provided on the communication device 104 for transmitting one or more signals to the detection unit 4 and receiver 112 is provided for receiving one or more signals from the detection unit 4 in use. Micro-processing means and/or data storage is provided in the communication device as required.

A transmitter 114 for transmitting one or more signals to the communication device 104 and a receiver 116 for receiving one or more signals from the communication device 104 can also be provided on detection unit 4 as required.

It is noted that reference to a transmitter and/or receiver herein covers any device capable of transmission and/or receiving one or more signals in use.

The communication device 104 can be used to remotely program the detection unit 4, to send or extract data therefrom, to communicate a detected condition or status of the detection unit and/or the like.

The communication device 104 is typically portable to allow it to be carried on a person in use. This allows a person to be informed of the status of the system even if they are remote from the system. However, the communication device could be a fixed device if required. For example, a member of staff at a climbing wall could carry the communication device on their person and a warning could be sent to the device 104 if an unsafe condition is detected. The staff member can then act appropriately based on the warning received.

It is to be noted that the detection unit 4 could provide different responses depending on the condition being detected. For example, it will be appreciated that some detected conditions could warrant being dealt with in an urgent manner and so a high level warning may be generated by the detection unit and/or communication device. Other detected conditions could warrant being dealt with in a less urgent manner and so a low or lower level warning may be generated by the detection unit and/or communication device in this situation. The number of warning levels or tiers could be determined depending on the user and/or application of use of the system.

Referring to FIGS. 3*a* and 3*b*, there is illustrated an example of how the detection system according to the present invention can be used for a climbing wall application. A climbing wall 202 protrudes vertically upwards from a ground surface 204. The climbing wall 202 includes a plurality of hand and foot hold members 206 located at spaced apart intervals on the wall 202 to help a climber 208 climb the wall 202.

An automatic belay system 210 is provided on the wall 202 which the climber 208 is required to be attached to for safety reasons so as to prevent the climber from falling off the wall in use. The automatic belay system 210 includes a sprung reel 212 located at the top of the wall to which a rope 214 is attached to. A carabiner located at an end of the rope 214 nearest the ground surface 204 is required to be clipped to a harness 216 worn by the climber 208 to allow the automatic belay system to function correctly in use.

In accordance with the present invention, detection system 2 is also used with the climbing wall arrangement to warn a climber if they have not correctly clipped onto the automatic belay system. More particularly, detection unit 4 is fixed to the climbing wall 202 a pre-determined distance above the ground surface 204. RFID tag 18 is located on the carabiner for clipping the climber onto the belay system 210.

In FIG. 3*a*, when the climber 208 is only a short distance off the ground, both the climber 208 and the RFID tag 18 are out of range of the thermal imaging camera 8 and RFID reader 10 in detection unit 4. The range of the detection unit 4 is shown by lines 218. No signal is initiated by the detection unit 4 and the climber 208 is sufficiently close to the ground surface 204 that they are unlikely to injure themselves if they were to fall when not connected to the automatic belay system 210.

With reference to FIG. 3*b*, as the climber 208 moves vertically upwards on the wall 202, the climber 208 comes into range 218 of the detection unit 4 and camera 8 detects that a person is within range of unit 4. At the same time, RFID reader 10 detects the presence of RFID tag 18. The detection unit 4 processes the signals generated from the reader 10 and camera 8 and determines that a person is climbing the wall and the person has the carabiner of the auto belay system attached to their harness. This is a safe condition and so the system can positively signal this, such as by illuminating a green light for example. If the detection unit 4 processes the signals and determines there is a person but no RFID tag, the unit determines that the carabiner is not clipped to the detected person's harness. This is an unsafe condition and so the system can positively signal this, such as by illuminating a red light for example or sounding a warning alarm. A warning signal could also be communicated by unit 4 to the communication device 104 of a staff member to let the staff member know that a climber is climbing in unsafe conditions. The staff member can then go and speak with the climber to correct the situation.

Where a plurality of climbing pathways are provided on a climbing wall with an automatic belay system associated with each pathway, it will be appreciated that a plurality of different RFID tags can be provided; one tag associated with each automatic belay system. Each RFID tag can provide a unique identification and the detection unit can be arranged so as to detect any number of different tags and/or determine whether a tag has been detected that should not be associated with a particular pathway. For example, this could detect whether a climber has strayed into the climbing pathway of another climber. It also allows a staff member to monitor a number of different climbing pathways at any time and understand the status of each individual climbing pathway without being present in person at the climbing wall.

Referring to FIG. 4, there is illustrated an example of how the detection system according to the present invention can be used for a tree top rope adventure application. Unlike the example given in FIGS. 3*a*-3*b* where the system is arranged to detect the safety of a climber when moving in a vertical direction, the example in FIG. 4 provides an at height safety system which detects the safety of a user when moving in a horizontal direction. In this example, the user typically largely maintains their height above a ground surface while moving between various rope activities. However, since the activities take place high up in the trees above a ground surface, there is still a safety risk to the user if they do not correctly apply their safety rope to their harness 216.

A rope 302 is located between two tree structures 304. Platforms 306 are provided on each tree 304 above the ground surface to allow a user to stand on the same at the start and end of the activity. The user is required to use the rope 302 to traverse between the two platforms 306 for the activity. A sliding mechanism is attached to rope 302 to allow a user to slide along rope 302 between the two trees. An attachment rope 310 is provided with a carabiner 312 at the end of and a user uses this carabiner to attach their harness 216 to the same. An RFID tag 18 is provided on the carabiner 312.

Detection unit 4 is located a pre-determined horizontal distance away from one end of the rope 302. The pre-determined distance is such that if a user is detected by camera 8 as being at the edge of the platform 306 without the carabiner clipped onto their harness (i.e. the RFID reader 10 in detection unit 4 is not able to detect tag 18) then an audible alarm is sounded. This prevents the user from stepping off the platform 306 without correctly being attached to the attachment rope 310.

Although the FIGS. 3*a*-4 illustrate use of the at height safety system for leisure applications, such as climbing walls or tree top adventure parks, it will be appreciated that the present invention could have many different uses in industrial applications, such as in monitoring the safety of workers on electrical pylons, wind turbines, construction sites and/or the like.

FIGS. 5*a* and 5*b* show how the present invention could be used on a rope access system. A user is required to be clipped to a safety system associated with a ladder in use in these examples. FIG. 5*b* shows the user being clipped to an automatic belay system 400.

The present invention could also be used to collect data rather than solely acting as a warning system. For example, the identification means could be used on safety items which can only be used a certain number of times before they are disposed of, repaired, serviced and/or the like. The detection system of the present invention can be used to detect and monitor the usage of the items with which the identification means are associated with, thereby allowing an accurate record to be kept of the items usage.

The system can also be used to track one or more of a plurality of workers, their equipment, safety of the workers, safety of the equipment, the time workers spend on a particular activity and/or the like.

What is claimed is:

1. An at height safety system for use in activities undertaken a minimum pre-determined height above a ground surface, said system including detection apparatus for location at at least one required position or in at least one pre-determined area that is to be monitored in use and at the minimum pre-determined height; identification means provided on or associated with an item that is to be monitored within the at least one required position or the at least one pre-determined area; and wherein said detection apparatus includes first detection means arranged for detecting a presence of a person using the at least one required position or the at least one pre-determined area; at least second detection means arranged for detecting the identification means in use within the at least one required position or the at least one pre-determined area; and processing means for processing one or more signals or data received from the first and at least second detection means, characterized in that the first detection means is arranged to verify the person has been detected within the at least one required position or the at least one pre-determined area at least partly based on any or any combination of a size or shape of the person within a pre-determined size or shape range; a temperature of the person within a pre-determined temperature range; or an image of the person within one or more pre-determined image parameters; wherein the processing means provides one or more pre-defined responses according to any or any combination of the following criteria: on receipt or detection of the one or more signals from the first and at least second detection means; on receipt or detection of one or more absolute values from the first or at least second detection means; in absence of detection of the one or more signals from the first and at least second detection means; or once a pre-determined threshold value has been identified by the first or at least second detection means.

2. The at height safety system according to claim 1, wherein the item with which the identification means are provided on or associated with is any or any combination of a portable item, a safety equipment item, an at height safety equipment item, an item worn by the person; a helmet, a climbing harness, a carabiner, a torch, a tool, glasses, safety goggles, a climbing accessory item, an item of clothing, or an item of footwear.

3. The at height safety system according to claim 1, wherein the identification means is passive in that it is not powered or does not actively transmit data or one or more signals therefrom in use; the at least second detection means sensing, reading or detecting data associated with the identification means in use; or wherein the identification means is active in that it is powered or actively transmits data or one or more signals therefrom in use; the at least second detection means sensing, reading or detecting data associated with the identification means in use.

4. The at height safety system according to claim 1, wherein the identification means is any or any combination of a beacon, a radio frequency identification (RFID) tag, a bar code, an electronic chip, or a QR code.

5. The at height safety system according to claim 1, wherein the at least second detection means is any detection device, sensing device or reader that allows detection, sensing, reading or monitoring of the identification means in use; or is any or any combination of a beacon sensor, an RFID reader, a bar-code reader, a QR code reader or an electronic chip reader.

6. The at height safety system according to claim 1, wherein the first detection means is any or any combination of temperature sensing means; a heat sensor, a thermal imaging camera, a thermal infra-red sensor, or GRID-EYE sensor.

7. The at height safety system according to claim 1, wherein the system collects or communicates data in real time or timing means or a clock is provided, and the system collects or communicates data in association with a pre-defined time or time period.

8. The at height safety system according to claim 1, wherein the one or more pre-defined responses includes any or any combination of a recorded response, recording response, a download response, a warning response, an alarm response, or a data collection response.

9. The at height safety system according to claim 1, wherein warning means are provided on or associated with the system to warn or inform a user or third party of a particular status, response or condition relating to the system; and wherein optionally the warning means are arranged to provide a visual warning, an audible warning or a kinesthetic warning.

10. The at height safety system according to claim 1, wherein different levels or tiers of warning means or responses can be generated by the system depending on the severity of a particular status detected by the system, first or at least second detection means in use.

11. The at height safety system according to claim 1, wherein the system includes communication means for allowing the data or the one or more signals to be communicated to or from the detection apparatus, the first and at least second detection means or the processing means in use; and optionally wherein the communication means includes at least one communication device separate to and remote from the detection apparatus to allow a third party remote to the detection apparatus to monitor the detection apparatus in use.

12. The at height safety system according to claim 1, wherein the system is an automatic belay safety system or a climbing tether safety system.

13. A method of using an at height safety system in activities undertaken a minimum pre-determined height above a ground surface, said system including detection apparatus for location at at least one required position or in at least one pre-determined area that is to be monitored in use and at the minimum pre-determined height; identification means provided on or associated with an item that is to be monitored within the at least one required position or the at least one pre-determined area; and wherein said method includes the step of detecting a presence of a person using the system and within the at least one required position or the at least one pre-determined area via first detection means; detecting the identification means within the at least one required position or the at least one pre-determined area using at least second detection means; and processing one or more signals or data received from the first and at least second detection means using processing means, characterized in that the first detection means is arranged to verify the person has been detected within the at least one required position or the at least one pre-determined area at least partly based on any or any combination of a size or shape of the person within a pre-determined size or shape range; a temperature of the person within a pre-determined temperature range; or an image of the person within one or more pre-determined image parameters; wherein the processing means provides one or more pre-defined responses according to any or any combination of the following criteria: on receipt or detection of the one or more signals from the first and at least second detection means; on receipt or detection of one or more absolute values from the first or at least second detection means; in absence of detection of the one or more signals from the first and at least second detection means; or once a pre-determined threshold value has been identified by the first or at least second detection means.

14. An item including identification means for use in an at height safety system according to claim 1.

15. The at height safety system according to claim 1, wherein the detection apparatus is a single or integral unity or housing.

16. The at height safety system according to claim 1, wherein the first and at least second detection means are provided in independent and separate housing or units.

17. The at height safety system according to claim 1, wherein power supply means are provided or associated with the detection apparatus for providing a power supply to the detection apparatus in use.

18. The at height safety system according to claim 1, wherein data storage means are provided on or associated with the system or detection apparatus for storing data in use.

* * * * *